United States Patent
Cho et al.

(10) Patent No.: US 12,539,732 B2
(45) Date of Patent: Feb. 3, 2026

(54) VEHICULAR AIR CONDITIONING SYSTEM

(71) Applicant: Hanon Systems, Daejeon (KR)

(72) Inventors: Hwan Kyu Cho, Daejeon (KR); Jae Woo Ko, Daejeon (KR); Dong Gyun Kim, Daejeon (KR); Chang Soo Bae, Daejeon (KR); Joon Yeong Lee, Daejeon (KR); Gyu Ik Han, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 209 days.

(21) Appl. No.: 18/389,460

(22) Filed: Nov. 14, 2023

(65) Prior Publication Data

US 2024/0166016 A1 May 23, 2024

(30) Foreign Application Priority Data

Nov. 18, 2022 (KR) .......................... 10-2022-0155638
Oct. 27, 2023 (KR) .......................... 10-2023-0146010

(51) Int. Cl.
*B60H 1/00* (2006.01)

(52) U.S. Cl.
CPC ..... *B60H 1/00278* (2013.01); *B60H 1/00485* (2013.01); *B60H 1/00814* (2013.01)

(58) Field of Classification Search
CPC ............ B60H 1/00278; B60H 1/00485; B60H 1/00814; B60H 1/323; B60H 2001/002; B60H 2001/00942

See application file for complete search history.

(56) References Cited

U.S. PATENT DOCUMENTS

| | | | | |
|---|---|---|---|---|
| 12,325,282 B2* | 6/2025 | Kim | ............... | B60H 1/00914 |
| 2017/0313158 A1* | 11/2017 | Porras | ............... | B60H 1/00828 |
| 2018/0281564 A1* | 10/2018 | Baek | ............... | B60H 1/00878 |
| 2022/0181722 A1* | 6/2022 | Kim | ............... | B60K 11/02 |
| 2024/0131900 A1* | 4/2024 | Shimauchi | ......... | B60H 1/00278 |

* cited by examiner

*Primary Examiner* — Marc E Norman
(74) *Attorney, Agent, or Firm* — NORTON ROSE FULBRIGHT US LLP

(57) ABSTRACT

A vehicular air conditioning system includes: a refrigerant circulation line including first and second evaporators through which refrigerant can flow in a cooling mode, and first and second expansion valves configured to depressurize and expand the refrigerant introduced into each of the first and second evaporators; and refrigerant flow control part provided in front of the first evaporator and the first expansion valve and configured to control refrigerant flow. The first evaporator is used for cooling rear seat region of a passenger room and the refrigerant flow control part is configured to supply and block the refrigerant with respect to the first evaporator and the first expansion valve and is configured to block the refrigerant when the cooling governed by the first evaporator is controlled in a turn-off mode and supply the refrigerant to the first evaporator and the first expansion valve depending on the on/off condition of the cooling governed by the second evaporator.

14 Claims, 6 Drawing Sheets

VEHICULAR AIR CONDITIONING SYSTEM

CROSS-REFERENCE TO RELATED PATENT APPLICATIONS

This application claims the benefit of Korean Patent Application No. 10-2022-0155638 dated Nov. 18, 2022 and 10-2023-0146010 dated Oct. 27, 2023. The disclosure of the above patent applications is hereby incorporated herein by reference in their entirety.

TECHNICAL FIELD

The present invention relates to a vehicular air conditioning system, and more particularly, a vehicular air conditioning system configured to prevent a decrease in total refrigerant flow volume due to blocking of refrigerant flow on the rear seat cooling first evaporator side when a rear seat cooling mode is off and a resultant excessive increase in refrigerant pressure in the air conditioning system, and capable of maintaining the refrigerant pressure in the air conditioning system in a stable state regardless of whether the rear-seat cooling mode is off, and consequently improving the control stability of the air conditioning system.

BACKGROUND ART

Examples of eco-friendly vehicles include electric vehicles, hybrid vehicles, and fuel cell vehicles (hereinafter collectively referred to as "vehicle").

As shown in FIG. 1, such a vehicle is provided with an air conditioning system 10 that cools and heats air conditioning regions.

The air conditioning system 10 is provided with a refrigerant circulation line 12. The refrigerant circulation line 12 includes a compressor 14, a condenser 15, evaporators 16 installed in parallel with each other, and expansion valves 17, 18 and 19 respectively installed on the upstream side of the evaporators 16.

The evaporators 16 include a first evaporator 16a used to cool a rear seat region of passenger room, a second evaporator 16b, i.e., a chiller used to cool a battery or electrical components of the vehicle, and a third evaporator 16c used to cool a front seat region of the passenger room.

The third evaporator 16c is installed on the front seat side of the passenger room with respect to a dash panel D, the first evaporator 16a is installed on the rear seat side of the passenger room with respect to a dash panel D, and the second evaporator(chiller) 16b that operates in a cooling mode for a battery and electric components is installed in a portion of the vehicle other than the passenger room with respect to the dash panel D, for example, in a power electronic room.

The second evaporator(chiller) 16b is installed on the upstream side of the first evaporator 16a and the third evaporator 16c with respect to flow direction of refrigerant.

The expansion valves 17, 18 and 19 are installed in the refrigerant circulation line 12 on the inlet side of the respective evaporators 16a, 16b and 16c to depressurize and expand the refrigerant introduced into the respective evaporators 16a, 16b and 16c.

The expansion valves 17, 18, and 19 are composed of electronic expansion valves (EXV), and are configured to have opening degrees that vary depending on the overheating degree of the refrigerant on the outlet side of the respective evaporators 16a, 16b and 16c.

In particular, the first evaporator expansion valve 17 is an integrated on-off valve having on-off valve functions, and has an opening amount that varies depending on the overheating degree of the refrigerant on the outlet side of the first evaporator 16a. When the rear seat region cooling is turned off, the expansion valve 17 is turned off to cut off the refrigerant flow to the first evaporator 16a.

Therefore, when the rear seat region cooling is turned off, the operation of the first evaporator 16a is stopped to prevent the rear seat region cooling.

However, this conventional air conditioning system has a disadvantage that the on-off integrated first evaporator expansion valve 17 is too large in size, and is very difficult to install.

In particular, the first evaporator expansion valve 17 has to be installed in the vehicle body around the rear seat region, and the vehicle body region is very narrow. Therefore, it is very difficult to secure a space for installing the large-sized first evaporator expansion valve 17.

In addition, in the conventional air conditioning system, the first evaporator expansion valve 17 is installed on the rear seat side. Therefore, refrigerant flow noise is generated when refrigerant circulates along a long path extending from the condenser 15 on the power electronic room side to the first evaporator expansion valve 17 on the rear seat side.

In particular, even when the rear-seat side cooling is turned off and the refrigerant flow to the first evaporator 16a is blocked, the pressure and vibration of the refrigerant on the condenser 15 side are applied to the rear-seat side first evaporator 16a along the refrigerant circulation line 12. Therefore, even though the refrigerant flow on the first evaporator 16a side is blocked, the refrigerant flow noise on the refrigerant circulation line 12 side is transmitted into the passenger room, thereby reducing the quietness in the passenger room.

Further, in the conventional air conditioning system, the first evaporator expansion valve 17 is an electronic expansion valve (EXV). Therefore, various PT sensors are required to detect the refrigerant pressure on the discharge side of the first evaporator 16a. The use of the PT sensors increases the manufacturing costs.

Further, in the conventional air conditioning system, when the rear seat region cooling is turned off, the on-off integrated first evaporator expansion valve 17 is turned off to block the refrigerant flow to the first evaporator 16a. In this process, the refrigerant to be circulated to the first evaporator 16a side is circulated only to the third evaporator 16c and the second evaporator(chiller) 16b side. Therefore, the refrigerant circulation amount on the third evaporator 16c and the second evaporator(chiller) 16b side is increased excessively.

In particular, the refrigerant in the refrigerant circulation line 12 is charged based on the refrigerant flowing toward the first evaporator 16a. As described above, when the refrigerant flow toward the first evaporator 16a is blocked, the first evaporator 16a through which the refrigerant can flow and the surrounding refrigerant circulation line 12 are also blocked, which leads to a decrease in total refrigerant flow volume at which the refrigerant can flow. Therefore, the refrigerant is excessively concentrated only on the third evaporator 16c and the second evaporator(chiller) 16b, and the internal pressure of the refrigerant circulation line 12 is increased excessively.

Therefore, the control stability of the air conditioning system deteriorates when cooling the passenger room, the battery and the electrical components. As a result, the cooling performance in the passenger room and the driving performance deteriorate.

In particular, the rotation speed (rpm) of the compressor 14 and the opening degrees of the electronic expansion valves 18 and 19 on the side of the third evaporator 16c and the second evaporator(chiller) 16b are variably controlled according to the refrigerant pressure in the refrigerant circulation line 12. As mentioned above, a malfunction occurs when the refrigerant pressure in the refrigerant circulation line 12 is increased excessively. Therefore, the cooling performance in the passenger room decreases.

Moreover, since the second evaporator(chiller) 16b has a small cooling load, the opening degree of the second evaporator expansion valve 18 needs to be precisely controlled to finely control its temperature. As mentioned above, if the refrigerant pressure in the refrigerant circulation line 12 increases excessively, the rotation speed control range of the compressor 14 becomes small, and the accurate calculation of refrigerant overheating degree is impossible. Therefore, the opening degree of the second evaporator expansion valve 18 cannot be accurately controlled.

This makes it difficult to accurately control the temperature of the second evaporator(chiller) 16b, which reduces the cooling performance of the battery and the electrical components. Therefore, the driving performance and the fuel efficiency of the vehicle are significantly reduced.

SUMMARY

In view of the problems inherent in the related art, it is an object of the present invention to provide a vehicular air conditioning system capable of reducing the size of a first evaporator expansion valve without impairing the refrigerant blocking function and consequently making it very easy to install the first evaporator expansion valve.

Another object of the present invention is to provide a vehicular air conditioning system capable of preventing the refrigerant pressure and vibration from acting on a first evaporator expansion valve when the refrigerant flow to the first evaporator is blocked.

A further object of the present invention is to provide a vehicular air conditioning system capable of preventing the refrigerant pressure and vibration generated under a condition of blocking refrigerant flow to a first evaporator from being transmitted to the passenger room and consequently improving the quietness in the passenger room.

A further object of the present invention is to provide a vehicular air conditioning system capable of making it unnecessary to use expensive electronic expansion valves and various PT sensors and consequently reducing the manufacturing costs.

A further object of the present invention is to provide a vehicular air conditioning system capable of maintaining refrigerant flow to a first evaporator through the operation of other evaporators even when the rear seat region cooling is turned off and the operation of the first evaporator is stopped.

A further object of the present invention is to provide a vehicular air conditioning system capable of preventing the decrease in total refrigerant flow volume due to the blocking of refrigerant flow to a first evaporator when the rear seat region cooling is turned off, the resultant concentration of refrigerant on a third evaporator and a second evaporator, and preventing the resultant excessive increase in refrigerant pressure in the air conditioning system.

A further object of the present invention is to provide a vehicular air conditioning system capable of maintaining the refrigerant pressure in the air conditioning system in a stable state regardless of whether the rear seat region cooling is turned off.

A further object of the present invention is to provide a vehicular air conditioning system capable of preventing the decrease in control stability of the air conditioning system due to an excessive increase in refrigerant pressure of the air conditioning system and the resultant decrease in cooling performance for the passenger room, the battery and the electrical components.

A further object of the present invention is to provide a vehicular air conditioning system capable of improving the cooling performance for the passenger room, the battery and the electrical components and consequently improving the driving performance, the fuel efficiency and the power efficiency of the vehicle.

In order to achieve these objects, there is provided a vehicular air conditioning system, including: a refrigerant circulation line including first and second evaporators through which refrigerant can flow in a cooling mode, and first and second expansion valves configured to depressurize and expand the refrigerant introduced into each of the first and second evaporators; and refrigerant flow control part provided in front of the first evaporator and the first evaporator expansion valve and configured to control refrigerant flow, wherein the first evaporator is used for cooling rear seat region of passenger room, and the refrigerant flow control part is configured to supply and block the refrigerant with respect to the first evaporator and the first expansion valve and is configured to block the refrigerant when the cooling governed by the first evaporator is controlled in a turn-off mode and supply the refrigerant to the first evaporator and the first evaporator expansion valve depending on the on/off condition of the cooling governed by the second evaporator.

The second evaporator may be used for cooling a battery or electrical components, and the refrigerant flow control part is configured to control refrigerant circulation to the first evaporator depending on an air conditioning mode even under a rear seat region cooling turn-off condition.

The air conditioning system further includes a third evaporator used for cooling front seat region of a passenger room and a third evaporator expansion valve installed on the upstream of the third evaporator.

The expansion valve on the upstream side of the first evaporator may have a thermostatic structure in which an opening degree of a throttling flow path is variably controlled according to the temperature of the refrigerant on the discharge side of the first evaporator, and a notch portion may be formed in one of the throttling flow path and a valve body to allow a part of the refrigerant to pass through the throttling flow path even when the throttling flow path is closed by the valve body.

The refrigerant flow control part may include an on-off valve configured to be turned on and off to open or close the refrigerant circulation line upstream of a first evaporator expansion valve, and a valve control part configured to control an on/off operation of the on-off valve according to the air conditioning mode under the rear seat region cooling turn-off condition.

The second evaporator is a chiller used for cooling the battery and the electrical components, and the valve control part of the refrigerant flow control part may be configured to control the on/off operation of the on-off valve depending on whether the refrigerant flows toward the chiller under the rear seat region cooling turn-off condition and control the refrigerant flow toward the first evaporator depending on whether the chiller is operated.

The valve control part of the refrigerant flow control part may be configured to, when the refrigerant flows toward the chiller under the rear seat region cooling turn-off condition, turn on the on-off valve and open the refrigerant circulation line to allow the refrigerant in the refrigerant circulation line to flow toward the first evaporator.

The valve control part of the refrigerant flow control part may be configured to, when the refrigerant flow toward the chiller is blocked under the rear seat region cooling turn-off condition, turn off the on-off valve and close the refrigerant circulation line to prevent the refrigerant in the refrigerant circulation line from flowing toward the first evaporator.

The valve control part of the refrigerant flow control part may be configured to, when front seat region cooling is turned on, electrical component region cooling is turned off and rear seat region cooling is turned off, turn off the on-off valve to prevent the refrigerant in the refrigerant circulation line from flowing toward the first evaporator.

According to the vehicular air conditioning system of the present invention, the first evaporator expansion valve is configured as a thermostatic type, and the separate on-off valve is installed to control the circulation of the refrigerant to the first evaporator. Therefore, the depressurization/expansion action of the refrigerant for the first evaporator and the action of blocking and allowing the refrigerant flow can be dualized. This makes it possible to reduce the size of the first evaporator expansion valve without impairing the refrigerant blocking function.

In addition, since the size of the first evaporator expansion valve can be reduced without impairing the refrigerant blocking function, it is very easy to install the first evaporator expansion valve, which makes it possible to improve the ease of assembly and the workability.

In addition, since the on-off valve is installed in the portion of the refrigerant circulation line outside the passenger room, the refrigerant flowing to the first evaporator in the rear seat region can be blocked in the portion other than the passenger room.

In addition, the refrigerant flowing to the first evaporator in the rear seat region can be blocked in the portion other than the passenger room. Therefore, when the refrigerant flow to the first evaporator is blocked due to the stoppage of the rear seat region cooling, the refrigerant pressure and vibration acting on the first evaporator expansion valve inside the passenger room can be blocked in advance outside the passenger room.

In addition, since the refrigerant pressure and vibration acting on the first evaporator expansion valve inside the passenger room can be blocked in advance outside the passenger room when the refrigerant flow to the first evaporator is blocked due to the stoppage of the rear seat region cooling, it is possible to prevent the refrigerant pressure and vibration generated under the condition of blocking the refrigerant flow to the first evaporator from being transmitted to the passenger room and to consequently improve the quietness in the passenger room.

In addition, since the first evaporator expansion valve is of a thermostatic type, it is unnecessary to use expensive electronic expansion valves and various PT sensors and to consequently reduce the manufacturing costs.

In addition, the air conditioning system is provided with the refrigerant flow control part for controlling the refrigerant flow on the first evaporator side, so that even when the rear seat region cooling is turned off and the operation of the first evaporator is stopped, the refrigerant flow control part can maintain the refrigerant flow to the first evaporator depending on the operation of other evaporators. Therefore, it is possible to prevent the decrease in total refrigerant flow volume due to the blocking of the refrigerant flow to the first evaporator when the rear seat region cooling is turned off, the resultant concentration of the refrigerant on the third evaporator and the second evaporator, and to prevent the resultant excessive increase in refrigerant pressure in the air conditioning system.

In addition, since the decrease in total refrigerant flow volume due to the blocking of the refrigerant flow to the first evaporator when the rear seat region cooling is turned off, the resultant concentration of the refrigerant on the third evaporator and the second evaporator, and the resultant excessive increase in refrigerant pressure in the air conditioning system can be prevented, it is possible to maintain the refrigerant pressure in the air conditioning system in a stable state regardless of whether the rear seat region cooling is turned off.

In addition, since the refrigerant pressure in the air conditioning system can be maintained in a stable state regardless of whether the rear seat region cooling is turned off, it is possible to prevent the decrease in control stability of the air conditioning system due to an excessive increase in refrigerant pressure of the air conditioning system and the resultant decrease in cooling performance for the passenger room, the battery and the electrical components.

In addition, since the decrease in control stability of the air conditioning system due to an excessive increase in refrigerant pressure of the air conditioning system and the resultant decrease in cooling performance for the passenger room, the battery and the electrical components can be prevented, it is possible to improve the cooling performance for the passenger room, the battery and the electrical components and to consequently improve the driving performance, the fuel efficiency and the power efficiency of the vehicle.

DETAILED DESCRIPTION

A preferred embodiment of a vehicular air conditioning system according to the present invention will now be described in detail with reference to the accompanying drawings.

Figure 1:
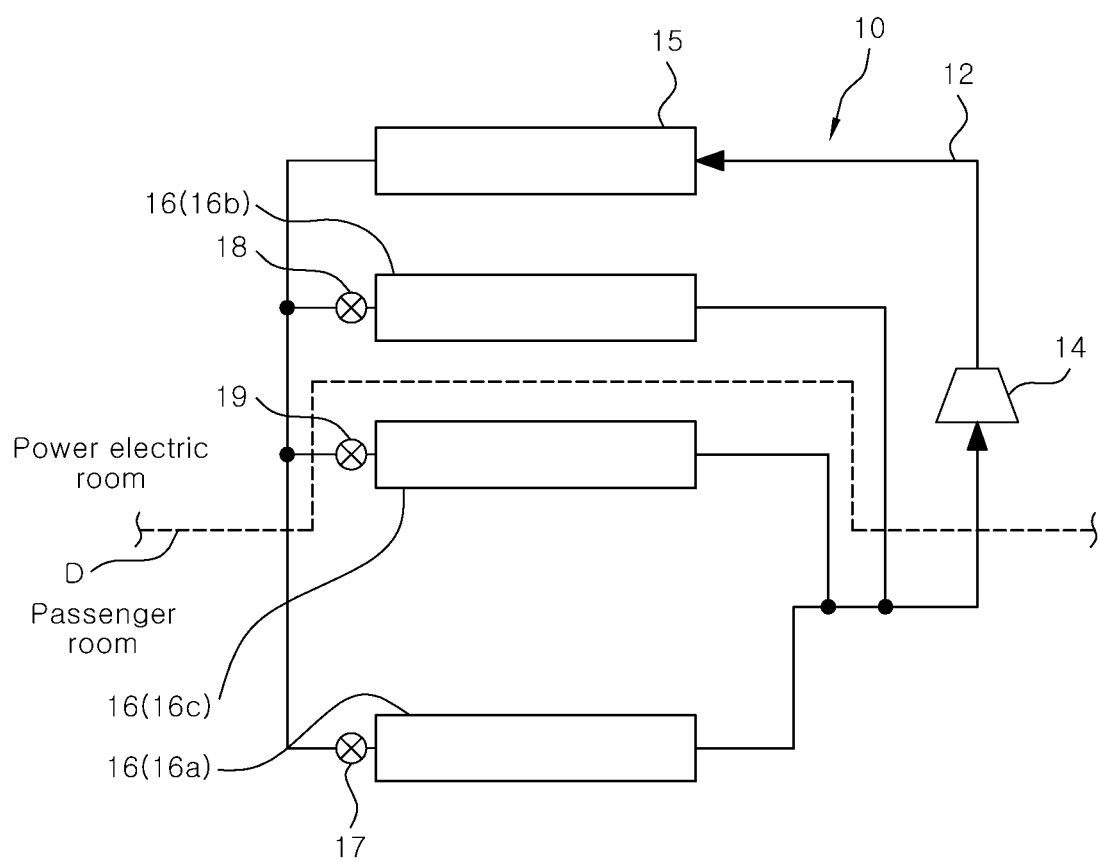
FIG. 1 is a view showing the configuration of a conventional vehicular air conditioning system.

Prior to describing features of the vehicular air conditioning system according to the present invention, the configuration of the vehicular air conditioning system will be described briefly with reference to FIG. 1.

The air conditioning system 10 is provided with a refrigerant circulation line 12. The refrigerant circulation line 12 includes a compressor 14, a condenser 15, evaporators 16 installed in parallel with each other, and expansion valves 17, 18 and 19 respectively installed on the upstream side of the evaporators 16.

The evaporators 16 include a first evaporator 16a used to cool rear seat region of the passenger room, a second evaporator 16b, i.e., a chiller used to cool a battery or electrical components of a vehicle, and a third evaporator 16c used to cool front seat region of the passenger room.

The third evaporator 16c is installed on the front seat side of the passenger room with respect to a dash panel D, the first evaporator 16a is installed on the rear seat side of the passenger room with respect to a dash panel D, and the second evaporator(chiller) 16b that operates in a cooling mode for a battery and electric components is installed in a portion of the vehicle other than the passenger room with respect to the dash panel D, for example, in a power electronic room.

The second evaporator(chiller) 16b is installed on the upstream side of the first evaporator 16a and the third evaporator 16c with respect to flow direction of refrigerant.

The expansion valves 17, 18 and 19 are installed in the refrigerant circulation line 12 on the inlet side of the respective evaporators 16a, 16b and 16c. The expansion valves 17, 18 and 19 include first evaporator expansion valve 17 on the upstream side of the first evaporator 16a, second evaporator expansion valve 18 on the upstream side of the second evaporator(chiller) 16b, and third evaporator expansion valve 19 on the upstream side of the third evaporator 16c. The expansion valves 17, 18 and 19 depressurize and expand the refrigerant introduced into the respective evaporators 16a, 16b and 16c.

Among the expansion valves 17, 18 and 19, the expansion valve 18 on the second evaporator(chiller) 16b side and the expansion valve 19 on the third evaporator 16c side are composed of electronic expansion valves (EXV) having integrated on-off function, and configured to have opening degrees that vary depending on the overheating degree of the refrigerant on the outlet side of the second evaporator (chiller) 16b and the third evaporator 16c.

Figure 2:
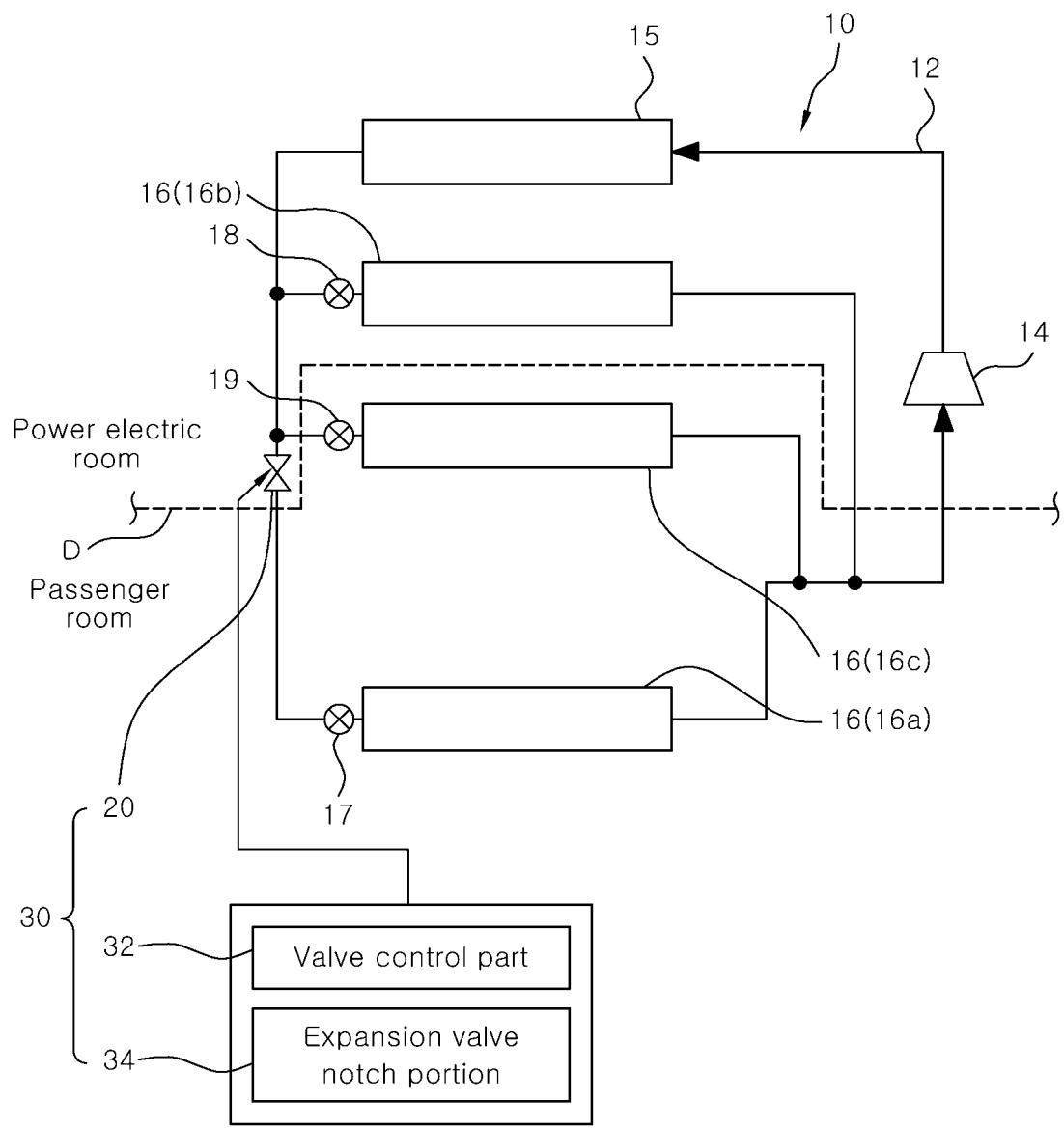
FIG. 2 is a view showing the configuration of a vehicular air conditioning system according to the present invention.

Next, the features of the vehicular air conditioning system according to the present invention will be described in detail with reference to FIG. 2.

First, the air conditioning system of the present invention is provided with a first evaporator expansion valve 17 installed on the upstream side of the first evaporator 16a. The first evaporator expansion valve 17 has a thermostatic (TXV) structure.

The first evaporator expansion valve 17 having a thermostatic structure is installed in the passenger room, and includes a thermostatic chamber (not shown) filled with a gas, a diaphragm (not shown) that moves up and down in response to the expansion or contraction of the gas in the thermoelectric chamber, and a push rod (not shown) that moves axially in response to the up/down movement of the diaphragm and pushes a valve body (not shown).

In the thermostatic first evaporator expansion valve 17, when the gas in the thermoelectric chamber expands or contracts depending on the temperature of the refrigerant discharged from the first evaporator 16a, the diaphragm moves up and down in response thereto. The push rod moves in the axial direction in response to the up/down movement of the diaphragm and pushes the valve body, thereby controlling the opening degree of a throttling flow path.

The thermostatic first evaporator expansion valve 17 detects the overheating degree of the refrigerant on the discharge side of the first evaporator 16a through the gas in the thermostatic chamber, and then uses the overheating degree to control the depressurization/expansion amount of the refrigerant flowing toward the first evaporator 16a.

Therefore, unlike the prior art, there is no need to use expensive electronic expansion valves and various PT sensors, which makes it possible to reduce the manufacturing costs.

In addition, the thermostatic first evaporator expansion valve 17 does not have an on-off valve function. Therefore, the size of the thermostatic first evaporator expansion valve 17 is smaller than that of the prior art.

Therefore, it is very easy and simple to install the thermostatic first evaporator expansion valve 17 in the vehicle body portion around the narrow rear seat region. As a result, it is possible to improve the ease of assembly and the workability.

Meanwhile, the thermostatic first evaporator expansion valve 17 has a structure in which a notch portion (not shown) is formed in either an internal throttling flow path or a valve body.

The notch portion allows a part of the refrigerant to flow through the throttling flow path even when the throttling flow path is closed by the valve body.

The reason for adopting this configuration is to assure that even when the rear seat region cooling is turned off and the operation of the first evaporator 16a is stopped, if the other evaporator, for example, the second evaporator(chiller) 16b is turned on, the refrigerant is allowed to partially flow from the condenser 15 to the first evaporator 16a.

Therefore, when the refrigerant flow on the first evaporator 16a side is completely blocked in a rear seat region cooling turn-off state, it is possible to prevent the resultant decrease in total refrigerant flow volume, the concentration of refrigerant on the side of the third evaporator 16c and the second evaporator(chiller) 16b, and to prevent the excessive increase in refrigerant pressure in the air conditioning system.

Thus, the refrigerant pressure in the air conditioning system can always be maintained in a stable state regardless of the rear seat region cooling turn-off state. As a result, it is possible to prevent the decrease in control stability of the air conditioning system due to the excessive increase in refrigerant pressure in the system, and the decrease in cooling performance for the passenger room, the battery and the electrical components.

The structure of the thermostatic first evaporator expansion valve 17 having the notch portion is disclosed in Korean Patent Application No. 10-2012-0090595 filed by the present applicant. Therefore, detailed description of the notch portion will be omitted.

Additionally, the air conditioning system of the present invention further includes a 2-way on-off valve 20 that blocks or allows the flow of refrigerant from the condenser 15 to the first evaporator 16a depending on the air conditioning mode conditions.

The on-off valve 20 is configured separately from the thermostatic first evaporator expansion valve 17, and is installed in the refrigerant circulation line 12 between the condenser 15 and the first evaporator expansion valve 17.

In particular, the on-off valve 20 is installed in a portion of the refrigerant circulation line 12 between the condenser 15 and the first evaporator expansion valve 17, which is spatially separated from the thermostatic first evaporator expansion valve 17.

More specifically, the on-off valve 20 is installed in a portion of the refrigerant circulation line 12 between the condenser 15 and the first evaporator expansion valve 17 outside the passenger room with respect to the dash panel D, for example, in a portion of the refrigerant circulation line 12 on the power electronic room side when the condenser 15 is installed in the power electronic room.

The on-off valve 20 is configured separately from the thermostatic first evaporator expansion valve 17 so as to block or allow the flow of refrigerant from the condenser 15 to the first evaporator 16a. Therefore, the on-off valve 20 performs the on-off valve function of the conventional on-off integrated first evaporator expansion valve 17 (see FIG. 1).

In particular, when the rear seat region cooling is turned on, the on-off valve 20 is also turned on to open the refrigerant circulation line 12, thereby allowing the refrigerant to flow from the condenser 15 to the first evaporator 16a.

Therefore, the depressurization/expansion of the refrigerant in the thermostatic first evaporator expansion valve 17 is allowed, and the operation of the first evaporator 16a is started in response to the depressurization/expansion of the refrigerant so as to cool the rear seat region in the passenger room.

When the rear seat region cooling is turned off, the on-off valve 20 is turned off to close the refrigerant circulation line 12, thereby blocking the flow of the refrigerant from the condenser 15 to the first evaporator 16a.

Therefore, the depressurization/expansion of the refrigerant in the first evaporator expansion valve 17 can be restricted. Due to the restriction of the depressurization/expansion of the refrigerant, the operation of the first evaporator 16a is stopped to restrict the cooling of the rear seat region.

Meanwhile, the on-off valve 20 of this structure is configured separately from the thermostatic first evaporator expansion valve 17. Therefore, unlike the conventional first evaporator expansion valve 17 having the integrated on-off function, the depressurization/expansion action of the refrigerant for the first evaporator 16a and the refrigerant flow blocking/allowing action are dualized.

Therefore, it is possible to reduce the size of the first evaporator expansion valve 17. As a result, it is possible to improve the ease of assembly and the workability of the first evaporator expansion valve 17 to the vehicle body.

In addition, since the on-off valve 20 is installed in a portion of the refrigerant circulation line 12 outside the passenger room, for example, in a portion of the refrigerant circulation line 12 on the power electronic room side, it is possible to block the refrigerant flowing toward the first evaporator 16a outside the passenger room.

In particular, when the refrigerant flow toward the first evaporator 16a is blocked due to the rear seat region cooling being turned off, the refrigerant flow toward the first evaporator 16a can be blocked in a portion other than the passenger room.

Therefore, when the refrigerant flow to the first evaporator 16a is blocked due to the rear seat region cooling being turned off, the refrigerant pressure and vibration acting on the first evaporator expansion valve 17 inside the passenger room can be blocked in advance outside the passenger room.

As a result, it is possible to prevent the refrigerant pressure and vibration from being transmitted to the passenger room under the condition of blocking the refrigerant flow on the first evaporator 16a and to consequently improve the quietness in the passenger room.

In this regard, the on-off valve 20 is preferably installed in the refrigerant circulation line 12 between the condenser 15 and the first evaporator expansion valve 17 of the power electronic room as close as possible to a branch point where the refrigerant circulation line 12 is branched into a line on the side of the first evaporator 16a and a line on the side of the third evaporator 16c.

This is to block the most upstream side of the refrigerant flow path extending from the condenser 15 to the first evaporator expansion valve 17 as much as possible.

As a result, when the refrigerant flow to the first evaporator 16a is blocked, it is possible to block the refrigerant flow as soon as possible, thereby effectively blocking the refrigerant pressure and vibration acting on the first evaporator expansion valve 17 inside the passenger room.

Referring again to FIG. 2, the air conditioning system of the present invention further includes a refrigerant flow control part 30 that can control the circulation of the refrigerant to the first evaporator 16a depending on the air conditioning mode even under the condition in which the rear seat region cooling governed by the first evaporator 16a is turned off.

The refrigerant flow control part 30 includes an on-off valve 20 configured to open and close the refrigerant circulation line 12 extending from the condenser 15 to the first evaporator 16a, a valve control part 32 configured to control an on-off operation of the on-off valve 20 depending on an air conditioning mode under a rear seat region cooling turn-off condition, and a notch portion 34 formed on the first evaporator expansion valve 17 so as to allow the refrigerant to flow from the refrigerant circulation line 12 toward the first evaporator 16a when the on-off valve 20 is turned on to open the refrigerant circulation line 12 depending on the air conditioning mode.

More specifically, the valve control part 32 is provided with a microprocessor. As shown in Table 1 below, under a rear seat region cooling turn-on condition, the valve control part 32 unconditionally turns on the on-off valve 20 to open the refrigerant circulation line 12.

Figure 3:
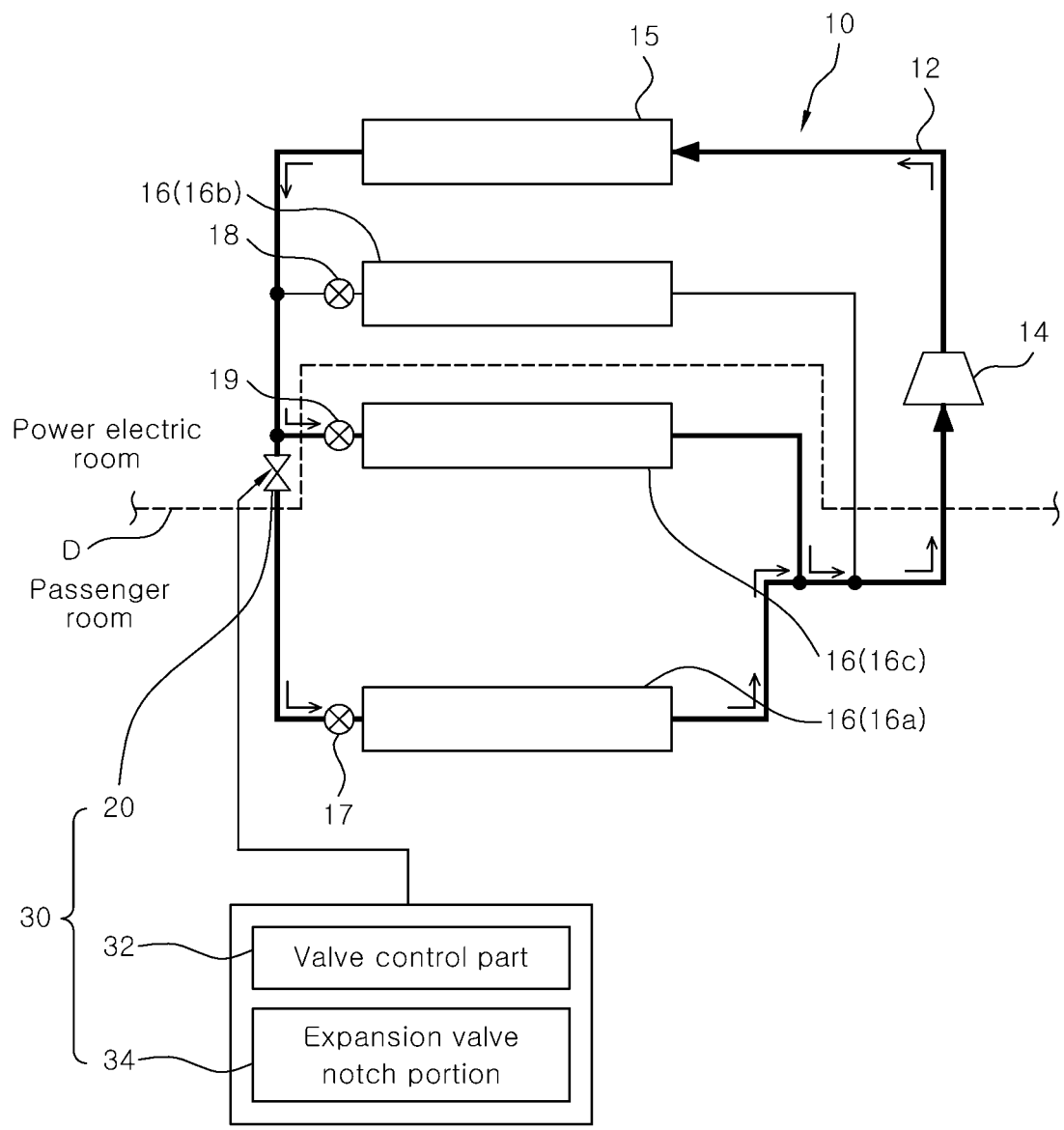
FIG. 3 is an operational diagram showing an example of the operation of the refrigerant flow control part constituting the vehicular air conditioning system of the present invention, and is a diagram showing a state in which the refrigerant is circulated to a first evaporator under a rear seat region cooling turn-on condition.

Therefore, under the rear seat region cooling turn-on condition, as shown in FIG. 3, the valve control part 32 allows the refrigerant to flow toward the first evaporator 16a and consequently allow the first evaporator 16a to perform a cooling operation, so that the rear seat region in the passenger room to be cooled.

TABLE 1

On-off control of the first evaporator side on-off valve in different air conditioning modes

| Battery cooling mode (chiller) (on: O) (off: X) | Front seat cooling mode (on: O) (off: X) | Rear seat cooling mode (on: O) (off: X) | On-off valve (on: refrigerant flow allowed) (off: refrigerant flow blocked) |
|---|---|---|---|
| X | O | X | off |
| X | O | O | on |
| X | X | O | on |
| O | O | X | on |
| O | O | O | on |
| O | X | O | on |
| O | X | X | on |

Meanwhile, as shown in Table 1 above, under the rear seat region cooling turn-off condition, the valve control part 32 controls the on-off operation of the on-off valve 20 depending on the air conditioning mode to open or close the refrigerant circulation line 12. The refrigerant flow toward the first evaporator 16a is allowed or blocked in response to the opening or blocking of the refrigerant circulation line 12.

In particular, even under the rear seat region cooling turn-off condition, if the battery/electric component cooling mode (hereinafter generally referred to as "battery cooling mode") is entered and the chiller 16b is operating (turned on), the valve control part 32 unconditionally turns on the on-off valve 20 to open the refrigerant circulation line 12.

Figure 4:
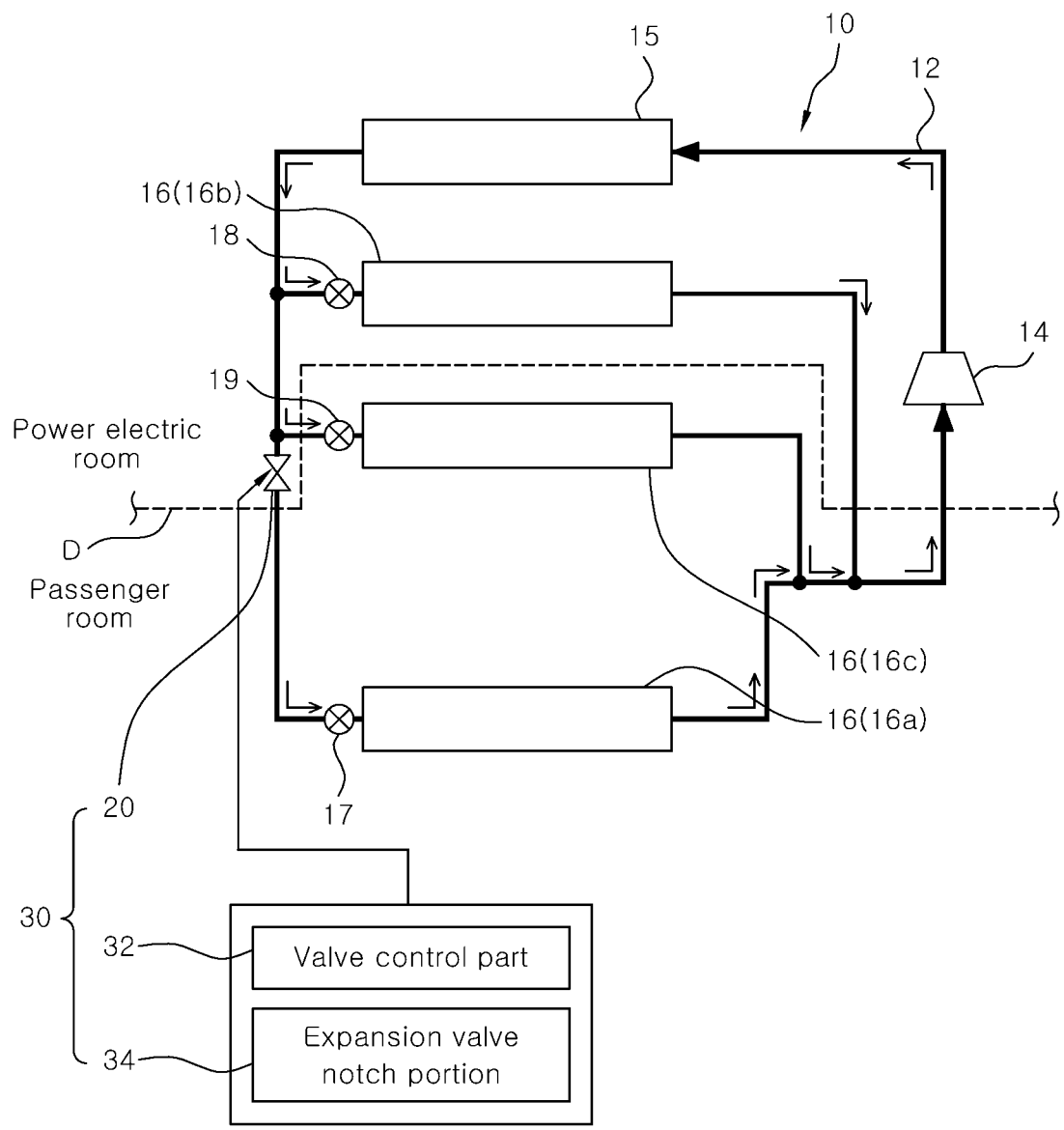
FIG. 4 is an operational diagram showing an example of the operation of the refrigerant flow control part constituting the vehicular air conditioning system of the present invention, and is a diagram showing a state in which the refrigerant is partially circulated to the first evaporator when a battery chiller is operated under a rear seat region cooling turn-off condition.

Therefore, even under the rear seat region cooling turn-off condition, if the refrigerant flows toward the second evaporator(chiller) 16b in an operating (turn-on) state, as shown in FIG. 4, the on-off valve 20 and the notch portion 34 of the first evaporator expansion valve 17 allow the refrigerant to circulate toward the first evaporator 16a.

In a nutshell, the refrigerant flow control part 30 can supply or block the refrigerant with respect to the first evaporator 16a, and the first evaporator expansion valve 17. The refrigerant flow control part 30 is configured to block the refrigerant under the condition that the rear seat region cooling governed by the first evaporator 16a is turned off, and to control the supply of the refrigerant to the first evaporator 16a and the first evaporator expansion valve 17 depending on the on-off state of the cooling governed by the second evaporator(chiller) 16b.

In particular, under the rear seat region cooling turn-off condition, the on-off valve 20 is configured to be simultaneously turned on or off depending on whether the second evaporator(chiller) 16b is operating (turned on), so that the refrigerant is allowed to circulate toward the first evaporator 16a when the second evaporator(chiller) 16b is operating (turned on).

Therefore, it is possible to prevent a decrease in total refrigerant flow volume that may occur when the refrigerant flow toward the first evaporator 16a side is completely blocked in the rear seat region cooling turn-off condition.

As a result, it is possible to prevent the refrigerant concentration in the third evaporator 16c and the second evaporator(chiller) 16b due to the decrease in total refrigerant flow volume, and to prevent the resultant excessive increase in refrigerant pressure in the air conditioning system.

In particular, the electronic expansion valve 18 on the second evaporator(chiller) 16b side has control stability that rapidly deteriorates when the refrigerant pressure in the air conditioning system increases. As described above, refrigerant circulation toward the first evaporator 16a is allowed by controlling the on-off valve 20 and the notch portion 34.

Since the excessive increase in refrigerant pressure in the air conditioning system is prevented by allowing the refrigerant to circulate to the first evaporator 16a, the control stability is maintained at a constant level.

Therefore, the opening degree of the second expansion valve 18 on the second evaporator(chiller) 16b side can be accurately controlled in accordance with the cooling load of the battery and electrical components. As a result, the cooling performance of the battery and electrical components can be improved.

Meanwhile, as shown in Table 1, when the battery cooling mode is released and the refrigerant flow toward the second evaporator(chiller) 16b is stopped under the rear seat region cooling turn-off condition, the valve control part 32 turns off the on-off valve 20 and blocks the refrigerant circulation line 12 regardless of whether the third evaporator 16c is operating (turned on).

Therefore, when the second evaporator(chiller) 16b is stopped (turned off) under the rear seat region cooling turn-off condition, even if the third evaporator 16c is operating (turned on), the valve control part 32 blocks the refrigerant flow toward the first evaporator 16a.

Figure 5:
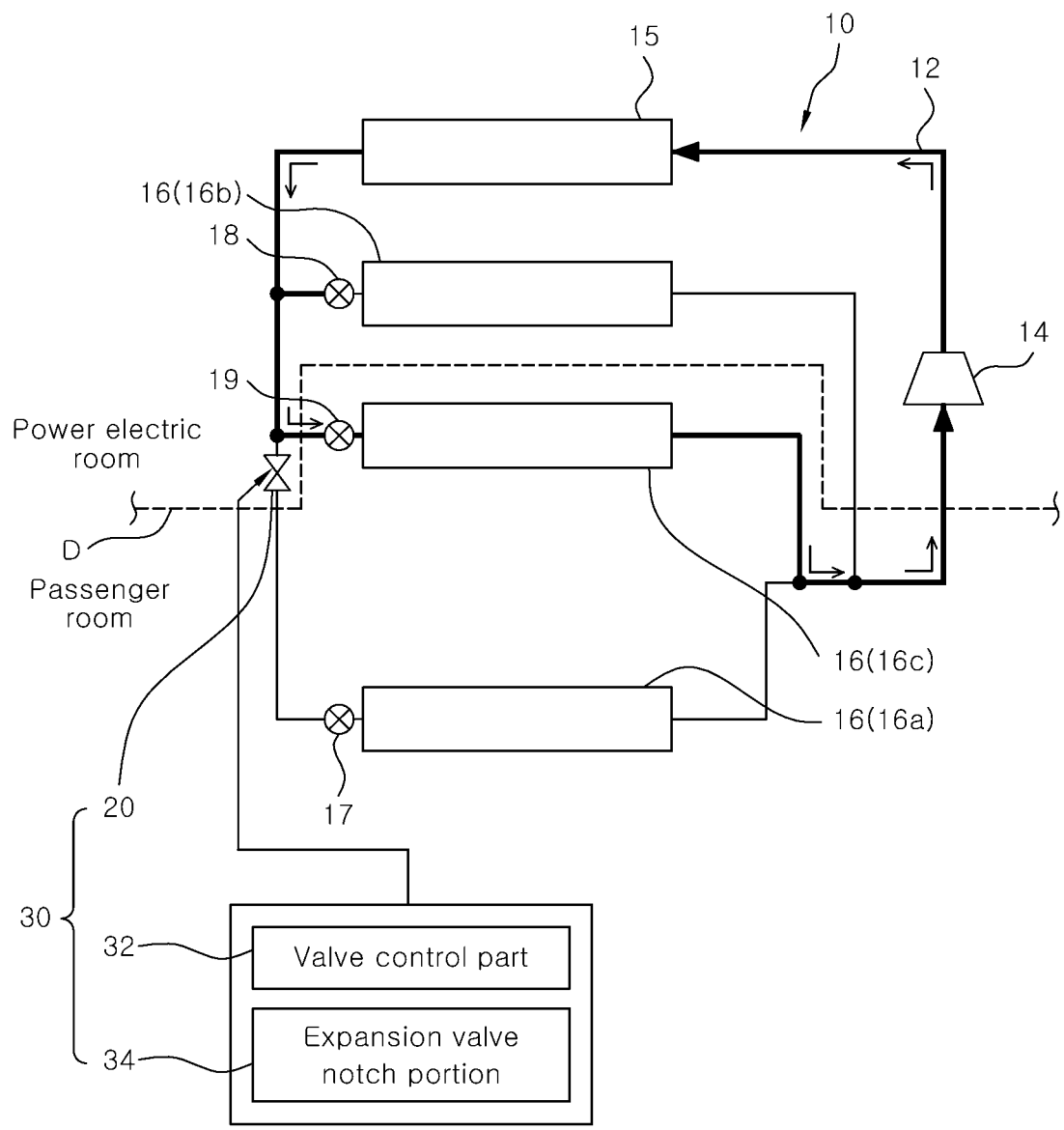
FIG. 5 is an operational diagram showing an example of the operation of the refrigerant flow control part constituting the vehicular air conditioning system of the present invention, and is a diagram showing a state in which the refrigerant circulation to the first evaporator is blocked under a rear seat region cooling turn-off condition and a non-operation condition of the battery chiller.

Accordingly, when only the third evaporator 16c is operating (turned on) under the rear seat region cooling turn-off condition, as shown in FIG. 5, the valve control part 32 blocks the refrigerant flow toward the first evaporator 16a.

Next, an operation example of the vehicular air conditioning system of the present invention having such a configuration will be described in detail with reference to FIGS. 2 to 6.

Figure 6:
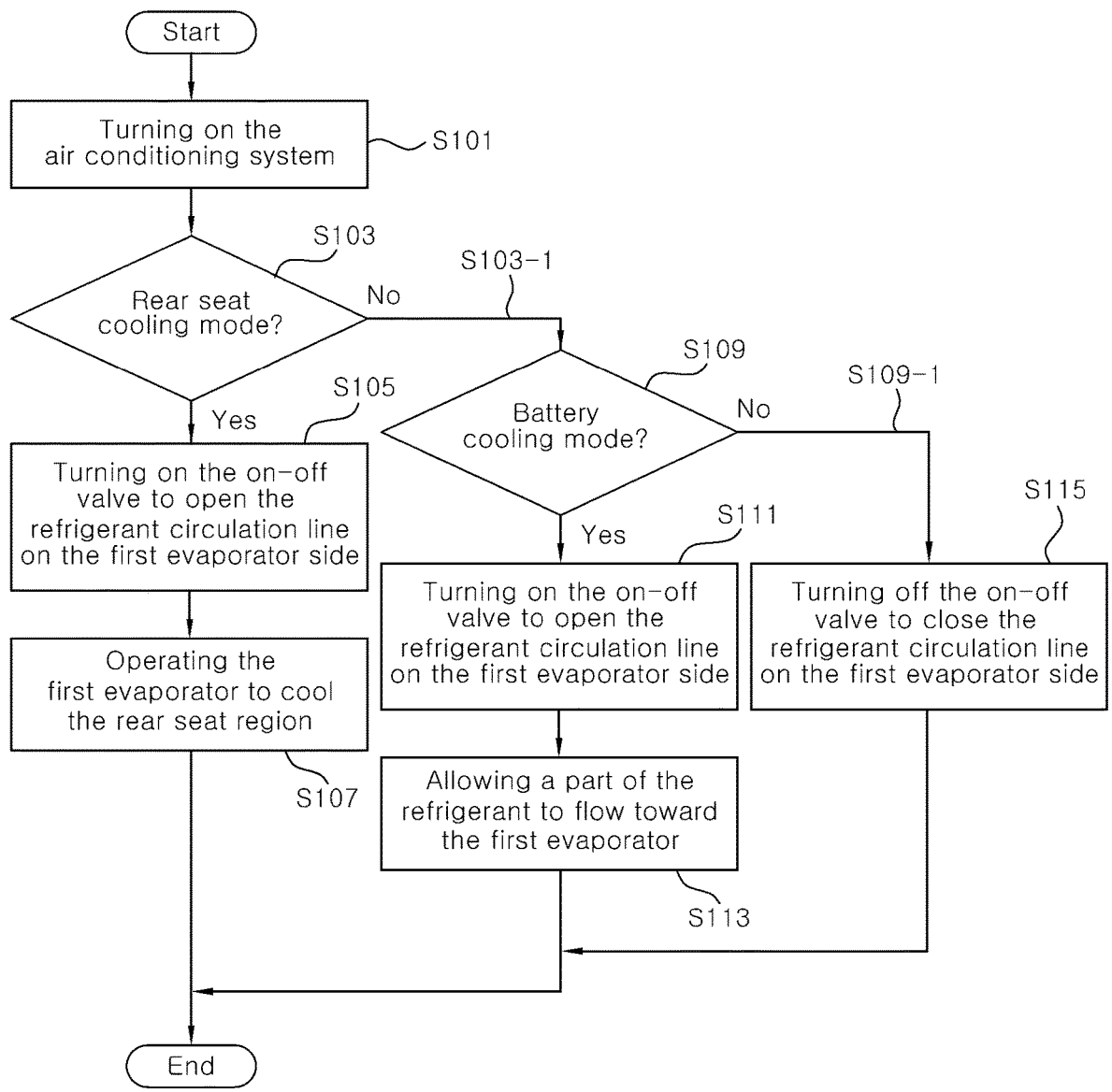
FIG. 6 is a flowchart showing an operation example of the vehicular air conditioning system according to the present invention.

Referring first to FIG. 6, when the air conditioning system is turned on (S101), the valve control part 32 determines whether the rear seat cooling mode is currently turned on (S103).

If it is determined that the rear seat cooling mode is turned on, the valve control part 32 unconditionally turns on the on-off valve 20 and opens the refrigerant circulation line 12 (S105).

Then, under a rear seat region cooling turn-on condition, as shown in FIG. 3, the first evaporator 16a is operated while allowing the refrigerant to flow toward the first evaporator 16a, and the rear seat region in the passenger room is cooled by the operation of the first evaporator 16a (S107).

Meanwhile, if it is determined that the rear seat cooling mode is not turned on (S103-1), i.e., if the rear seat cooling mode is turned off, the valve control part 32 determines whether a battery cooling mode is currently turned on and the second evaporator(chiller) 16b is operating (S109).

If it is determined that the battery cooling mode is turned on and the second evaporator(chiller) 16b is operating, the valve control part 32 turns on the on-off valve 20 and opens the refrigerant circulation line 12 (S111).

Then, as shown in FIG. 4, even under the rear seat region cooling turn-off condition, the on-off valve 20 and the notch portion 34 of the first evaporator expansion valve 17 allow the refrigerant to partially flow toward the first evaporator 16a (S113).

Therefore, even under the rear seat region cooling turn-off condition, the refrigerant circulates toward the first evaporator 16a and the refrigerant pressure in the refrigerant circulation line 12 is maintained stably.

Meanwhile, if it is determined in step S109 that the battery cooling mode is not currently turned on (S109-1) under the rear seat region cooling turn-off condition, i.e., the second evaporator(chiller) 16b is not operating, the valve control part 32 blocks the refrigerant circulation line 12 while turning off the on-off valve 20 (S115).

In particular, the refrigerant circulation line 12 is blocked by turning off the on-off valve 20 regardless of whether the third evaporator 16c is operating (turned on).

Then, as shown in FIG. 5, when the chiller 16b is not operating (turned off) under the rear seat region cooling turn-off condition, even if the third evaporator 16c is operating (turned on), the valve control part 32 blocks the refrigerant flow toward the first evaporator 16a.

While the preferred embodiments of the present invention have been described above, the present invention is not limited to the above-described embodiments. Various modifications and changes may be made without departing from the scope and spirit of the present invention defined in the claims.

What is claimed is:

1. A vehicular air conditioning system, comprising:
   a refrigerant circulation line including first and second evaporators through which refrigerant can flow in a cooling mode, and first and second expansion valves configured to depressurize and expand the refrigerant introduced into the first and second evaporators, respectively; and
   a refrigerant flow control part provided in front of the first evaporator and the first expansion valve and configured to control refrigerant flow,
   wherein the first evaporator is configured to cool a rear seat region of a passenger room, and the refrigerant flow control part is configured to supply and block the refrigerant with respect to the first evaporator and the first expansion valve and is configured to block the refrigerant when the cooling by the first evaporator is controlled in a turn-off mode and supply the refrigerant to the first evaporator and the first expansion valve depending on the on/off condition of the cooling by the second evaporator.

2. The system of claim 1, wherein the second evaporator is configured to cool a battery or electrical components, and the refrigerant flow control part is configured to control refrigerant circulation to the first evaporator depending on an air conditioning mode even under a rear seat region cooling turn-off condition.

3. The system of claim 2, wherein the system further includes a third evaporator configured to cool a front seat region of the passenger room, and a third expansion valve installed on the upstream of the third evaporator.

4. The system of claim 3, wherein said first expansion valve on the upstream side of the first evaporator has a thermostatic structure in which an opening degree of a throttling flow path is variably controlled according to the temperature of the refrigerant on the discharge side of the first evaporator, and
   a notch portion is formed in one of the throttling flow path and a valve body to allow a part of the refrigerant to pass through the throttling flow path even when the throttling flow path is closed by the valve body.

5. The system of claim 4, wherein the refrigerant flow control part includes an on-off valve configured to be turned on and off to open or close the refrigerant circulation line upstream of a first evaporator expansion valve, and a valve control part configured to control an on/off operation of the on-off valve according to the air conditioning mode under the rear seat region cooling turn-off condition.

6. The system of claim 5, wherein the second evaporator is a chiller configured to cool a battery or electrical components, and
   the valve control part of the refrigerant flow control part is configured to control the on/off operation of the on-off valve depending on whether the refrigerant flows toward the chiller under the rear seat region cooling turn-off condition and control the refrigerant flow toward the first evaporator depending on whether the chiller is operated.

7. The system of claim 5, wherein the valve control part of the refrigerant flow control part is configured to, when the refrigerant flows toward the second evaporator under the rear seat region cooling turn-off condition, turn on the on-off valve and open the refrigerant circulation line to allow the refrigerant in the refrigerant circulation line to flow toward the first evaporator.

8. The system of claim 5, wherein the valve control part of the refrigerant flow control part is configured to, when the refrigerant flow toward the second evaporator is blocked under the rear seat region cooling turn-off condition, turn off the on-off valve and close the refrigerant circulation line to prevent the refrigerant in the refrigerant circulation line from flowing toward the first evaporator.

9. The system of claim 5, wherein the valve control part of the refrigerant flow control part is configured to, when front seat region cooling is turned on, electrical component region cooling is turned off and rear seat region cooling is turned off, turn off the on-off valve to prevent the refrigerant in the refrigerant circulation line from flowing toward the first evaporator.

10. The system of claim 5, wherein the first evaporator expansion valve is installed on a portion of the refrigerant circulation line in the passenger room, and the on-off valve is installed on a portion of the refrigerant circulation line outside the passenger room and spatially separated from the first evaporator expansion valve.

11. The system of claim 10, wherein the on-off valve is installed on a portion of the refrigerant circulation line outside the passenger room and on the side of a power electric room of the vehicle.

12. The system of claim 11, wherein the on-off valve is installed on a portion of the refrigerant circulation line on the side of the power electric room of the vehicle at a branch point where the refrigerant circulation line is branched into a line on the side of the third evaporator and a line on the side of the first evaporator.

13. The system of claim 3, wherein the first evaporator, the second evaporator and the third evaporator are connected in parallel with each other, and the second evaporator is installed on upstream side of the first evaporator and the third evaporator with respect to flow direction of refrigerant.

14. The system of claim 3, wherein the expansion valves on the upstream side of the second evaporator and the third evaporator are electronic expansion valve (EXV) having integrated on-off valve function.

* * * * *